Patented Oct. 14, 1941

2,259,400

UNITED STATES PATENT OFFICE 2,259,400

FLAW DETECTION

Robert C. Switzer, Cleveland, Ohio

No Drawing. Application August 17, 1938,
Serial No. 225,421

13 Claims. (Cl. 250—71)

This invention relates to improvements in methods of detecting physical flaws in metallic bodies. More specifically, it relates to rapid and non-destructive tests for the location of cracks, blow-holes, leaks, piping, seams, shrinkage cavities and other defects in metallic articles.

It is of paramount importance in the metallurgical industries today that physical flaws be substantially eliminated in metallic products required to bear stress and withstand impact and wear, for it is recognized that failure of such metal products in service, with the resultant expense, damage and possible loss of life, is often attributable to hidden physical defects. The adoption in numerous plants of X-ray, electrical, microscopic and magnetic examination methods, as well as other expensive inspection techniques, indicates that the problem is of considerable consequence. Many varied magnetic devices, for example, have been proposed to explore metal products for detection of physical flaws by determination of their magnetic uniformity, and while generally slow, laborious and substantially unsatisfactory for examination of non-ferrous metals, they do offer decided improvements over the crude mechanical and visual inspection means often employed heretofore. In spite of many such recent developments, however, rapid, non-destructive and accurate methods of detecting flaws in production runs are needed, and it is an object of this invention to provide such methods.

The necessity for the detection of defective products is common to many branches of the metal industries. It is imperative that shrinkage cavities, blow-holes, cracks, cold shuts and the like be located in certain cast products; it is likewise important that pipings, blisters, and other characteristic defects be located in some forged and rolled products; it is necessary that fissures due to rupture or the failure of folds to weld be located in drawn products, etc. For the purpose of illustration only and not by way of limitation, the invention is herein described as applied particularly to the detection of physical flaws in metal castings, although it is to be understood that it may be applied to any metal products.

In the case of foundries shipping castings to their customers in a non-finished state for subsequent machining in the customer's plant, considerable difficulty is encountered in locating minute and hidden flaws prior to the initial shipping of the castings, as numerous physical flaws do not become visible until the outer casting surface is removed by machining. Thus, the responsibility of rigid inspection falls upon the buyer of the rough castings, who must mark the location of flaws revealed on defective castings, pack the rejects for shipment and return them to the foundry for remelting. In some cases, more than seventy-five percent (75%) of the castings originally shipped by foundries are returned due to such revelation of hidden flaws by machining. It is a further object of this invention to provide means of detecting such flaws prior to initial shipment of the product, thereby saving the costs of shipping defective castings to the customer as well as eliminating the expense of machining, handling and returning rejected castings to the foundry.

In normal practice today, flaws may not be revealed until subsequent machining weeks after pouring, and thousands of castings containing the same type of flaw may conceivably be poured and shipped during this interim with no effort being made to remove the cause of the hidden flaws. Another purpose of this invention is to provide means for detecting such hidden flaws rapidly and accurately within a short time after pouring, thus facilitating the taking of immediate steps to eliminate the cause of the flaws in subsequent pourings during the same run, and thereby reducing the considerable expense of pouring, handling and shipping large quantities of defective castings.

In the general practice of this invention in the metal casting industries, for example, rough castings are removed from the molds and, if necessary, are cleaned by abrasion in tumbling mills. The castings are then immersed, coated or otherwise treated with an identifiable agent, usually in solution, in such a manner that the agent penetrates the cracks, tears and other cavities in the castings. The agent used is generally carefully selected as being capable of exhibiting some distinctive luminescent property, reaction or diverse characteristic not exhibited by the casting material, by which it may be readily identified and differentiated from the casting surfaces. If the agent be applied as a fluid, it may be heated and pressure may be employed to increase its rate and depth of penetration into the fissures and cavities of the castings. After castings are treated, the agent is removed from the external surfaces by such methods as draining, wiping or shot-blasting, to leave clean metal surfaces in the proper condition for routine inspection. The distinctive agent which has penetrated the flaws then tends to seep slowly from the flaws, especially if it has been carried in an oily vehicle, and is subsequently identified by its contrasting luminescent properties, thereby automatically revealing the location of surface outlets of large as well as small and otherwise hidden flaws. Treated and cleaned castings may sometimes be treated with a second agent which fixes, absorbs, is dyed by, or otherwise reacts characteristically with the first agent remaining in and about the flaws to form, in the loci of the flaws, a reaction product which differs from the adjacent surfaces in some distinctive luminescent aspect and is thus readily detectable as an indicator of the position of physical flaws. The processes of treating castings with identifiable agents thus fall roughly into two classes; first, treatment with single agents, and secondly, treatment with a plurality of agents which depend more or less upon interaction for the production of a distinctive luminescent indicator.

Treatment of cast products may be accomplished in numerous ways, the method depending upon the state of finish and composition of the product involved, the maximum treating time and maximum cost permissible in a particular plant, fluctuations in the cost of materials, and other factors which may vary with each product and foundry. In the majority of cases, castings are immersed in solutions of identifiable agents, although they may be sprayed or brushed, and in some instances subjected to treatment with vapors, gases or fine powders. The rate and depth of penetration required in each specific instance are necessary considerations in the choice of method utilized, and the employment of super-atmospheric temperatures and pressures to increase both factors are important embodiments of this invention. If solutions in immersion tanks, for example, are heated or kept under high pressure with pumps, the penetration of flaws by the agent will be accelerated and often effected in minute flaws which would not otherwise be reached. To those versed in the nearest associated arts, it will be apparent that the viscosity, surface tension, and other characteristic properties of each material under consideration will likewise have consequential bearing upon the rate and depth of penetration. In general, light oils and other oily solvents appear to be very practical carriers for identifiable agents, as they penetrate readily and have a natural tendency to bleed or spread from flaws after immersion.

It has been found most advantageous in some cases to immerse and heat castings in solvents super-saturated at elevated temperatures with normally crystalline or solid chemicals, the solubility of which is measurably increased by the rise in temperature effected. If castings so treated are cleaned while hot, the recrystallization and precipitation of such chemicals as the solution cools is most beneficial, for the precipitate formed tends to pile up about the surface outlets of flaws as an unmistakable indicator of their locations. If certain normally solid, meltable substances, as petrolatums and waxes, are carried with the normally crystalline agents in a heated mutual solvent, it has been found that the cooling of the casting and precipitation of the agent is accompanied by the solidification of the meltable substance, which then serves as a solid binder for the precipitate that accumulates about the flaw outlets.

Treated castings may be drained in web baskets, on conveyors, in hot air blasts or ovens, in centrifugal dryers, etc., although in many cases, sufficient draining takes place as the castings are transported to the cleaning department, especially if the castings have been raised to an elevated temperature during treatment. Draining is normally followed by immediate and complete removal of the remainder of the agent from the external surfaces of the product and here, as before, the cleaning methods employed in each case will depend largely upon the composition of the product as well as the finish desired. Rough castings may be readily cleaned by impact with shot in the orthodox shot-blasting machines which utilize air or centrifugal force to throw a continuous stream of shot; other products may be cleaned by abrasion with sandblasting equipment or tumbling mills; and still other products may require solvent cleaning, air cleaning, wiping, brushing, etc. The castings may be inspected at any reasonable time after cleaning. The location of flaws is revealed by the identifiable luminescent agent, for the agent seeps from the flaws to the immediately adjacent cleaned surfaces, sometimes leaving the agent virtually "piled" around the surface openings of the flaws. The "bleeding" or seeping of the agent from the flaws may be hastened in any suitable manner, as by whirling the cleaned castings or striking them with sharp hammer blows, but a sufficient amount of the identifying agent will generally appear when cleaned castings are allowed to stand for a period of time before final inspection.

Treated and cleaned castings are normally inspected under a viewing condition so designed and controlled in each specific case as to cause maximum contrast between the cleaned casting surfaces and the particular extraneous substance retained in and about or seeping from the surface outlet of the flaws. It naturally follows that castings treated with any one agent, chosen because of its diverse and characteristic response to one particular form of radiant energy, for example, must be subjected during examination to the action of such energy. If castings are treated in other foundries with agents chosen because of their distinctive and characteristic luminescent response to light, such as monochromatic light carefully controlled as to intensity and direction of incidence, other visible light should be excluded during the final inspection of the castings so treated, and it has been found that colored gelatine light filters in combination with common light sources will provide monochromatic light practically in some cases. If, in still other instances, castings are treated with agents consisting of hot penetrating oils saturated with dyestuffs which cause the solutions to become vividly fluorescent during exposure to fluorescigenous radiant energy, inspection should normally be carried out in darkened or semi-darkened locations flooded with ultra-violet light from which visible light has been substantially filtered, for under this condition a maximum in contrast is effected between dark, non-fluorescent casting surfaces and the luminescent stains about flaw openings.

The utilization of varied fluorescent agents and inspection during exposure of the cleaned castings to filtered fluorescigenous radiant energy normally reveal the location of such flaws as cracks and tears by vivid light-emissions from jagged, uneven and ofttimes blurred fluorescent lines, while larger cavities, sections of porous metal and the like are revealed by colored light emitted by fluorescent smears and accumulations of fluorescent matters which often increase in size as the castings are allowed to stand. Fluorescigenous radiant energy for the excitation of various fluorescent agents is produced by X-ray tubes, cathode-ray tubes and carbon-arc equipment, as examples, but high-intensity quartz mercury arc lamps are generally employed at the present time. If the radiations from such a source are filtered through "Corex," for example, properly colored in accordance with known practices in the vapor lamp industry to substantially absorb the visible light produced by the lamp and to pass a maximum of the invisible ultra-violet radiations, cleaned casting surfaces will ordinarily appear very dark purple or black during exposure to same and fluorescent indicators will exhibit maximum visibility. Such quartz mercury arc burners, fitted with proper filters and reflectors, provide excellent production means for causing intense fluorescence in a very wide range of commercially available substances, as they are high in output of comparatively short-wave as well as long-wave ultra-violet radiations.

The treatment of metal products with a plurality of agents usually consists, firstly, in the application of primary agents in the general manner heretofore described for single agent treatment, and secondly, in the application of secondary agents reactive with the primary substances retained in and about the flaws to form, in the proximity and loci of the flaws, a reaction product differing from the adjacent metal surfaces in some distinctive luminescent characteristic, as in its response to a particular form of radiant energy. Such secondary agents may take the form of "fluorescence developers" which, upon inter-action with carefully selected primary agents, form a product capable of exhibiting brilliant fluorescence under filtered ultra-violet light; they may also take the form of coatings or fixatives, which "fix" or preserve the distinctive reaction product formed in the locality of flaws, etc. In some cases, the secondary agent may depend for its action upon its ability to absorb or pull a portion of the primary agent from the flaws of the casting; in certain instances, the secondary treatment may take such specialized form as heat or gas application, etc., while at other times, the secondary agent may serve the dual purpose of identifying the primary agent and also acting as a protective coating for the metal product, thereby minimizing such actions as rust and abrasion. Secondary agents in liquid form may be applied by such means as immersion, brushing or spraying, whereas the application of powdered agents may entail blowing, dusting, tumbling, and the like. The methods of application employed with each particular combination of primary and secondary agent depend largely upon the specific function of each of the inter-acting agents, as well as upon numerous other factors previously described as governing the choice of application methods used with single agents. It is intended that the term "react" as herein used is to be interpreted in its broadest sense, and that it include "to cause physical or chemical transformation or change" as well as "to act in response," and "to exert counteracting influence."

The viewing condition for inspection of metal products treated with a plurality of agents must necessarily be so designed in each instance as to include lighting conditions under which the luminescent reaction product of any plurality of agents responds diversely from the response of the article being treated. If the agents used have been designed to produce distinctive fluorescence in the proximity of defects, metal products treated with same will generally be viewed in darkened locations under filtered fluorescigenous energy radiated by the most convenient type of equipment available. In all cases, where the plurality of agents used have been designed to produce a luminescent reaction, metal products treated with them will generally be examined under lighting conditions chosen to cause the greatest possible contrast between the broad metal surfaces and the areas where distinctive luminescent change has occurred.

It should be very apparent to those versed in the nearest associated arts that the above-described embodiments of this invention are indicative of but a few of the many varied ways in which the principles of this invention may be employed, and it is to be understood that many omissions, alterations and replacements in the procedures and techniques above-described may be made without departing from the intended broad spirit and scope of the invention. To further describe the invention and to demonstrate the many variations possible in materials used, technique employed and results obtained, the following illustrative but in no way limitative examples are cited

*Example 1.*—A very successful series of single agent detection methods comprise treatment of metal products with solutions capable of fluorescing in the fluid state and subsequent inspection of the cleaned articles under filtered fluorescigenous radiant energy. Many naturally fluorescent solutions have been used for this purpose, as have numerous fluorescent solutions prepared by the addition of certain fluorescent "concentrates" to substantially colorless oils and other solvents.

Lubricating oils almost without exception fluoresce to some extent, and most Pennsylvania and other oils exhibiting a high "bloom" fluoresce vividly upon exposure to fluorescigenous radiant energy; numerous oils of this kind have thus been used for the purposes of this invention without the addition of artificial fluorescent "concentrates." The concentration of fluorescent materials contained in most naturally fluorescent oils is not usually high, and when these oils spread out about the surface outlets of flaws, the fluorescence of the thin films in filtered ultra-violet light is not generally of marked intensity. Therefore, naturally fluorescent oils may not give the conclusive results possible with solutions to which relatively high percentages of fluorescent materials have been added.

*Example 2.*—The term fluorescent "concentrate" as herein used is intended to include materials which are capable of fluorescing in their dry, solid form and also those which are capable of fluorescing when in combination with other substances. The fluorescent "concentrates" used in the formulation of vividly fluorescent treating oils may take many varied forms, and may include, for example, the "green bloom extracts" normally added to lubricating oils to produce an artificial "bloom." A satisfactory extract of this nature is easily made by first distilling cracked asphalt residuum to bottoms having a melting point in the neighborhood of 350° F. to 400° F., and subsequently digesting the bottoms in lubricating oil.

Oil solutions which exhibit a range of fluorescent colors are readily produced by saturating light oils with a series of fluorescent "concentrates" sold commercially in convenient powdered form; the "Flurol" powders sold by the General Dyestuff Corp. of New York, N. Y., and the "H-W Dye" sold by Wilmot and Cassidy, Inc., Brooklyn, N. Y., are characteristic. They are soluble in a very wide variety of oils and other solvents, but give best results generally when used in non-oxidizing and substantially colorless solvents.

Example 3.—A very successful flaw detection procedure comprises treatment of castings with oil saturated with fluorescent "concentrates" which exhibit vivid fluorescence in crystalline form. In this procedure, it is important that a maximum of fluorescent "concentrate" be dissolved in the oil, and it has been found that such steps as the heating of the oil and the addition of moderate percentages of petrolatums or waxes, for example, aid considerably in concentrating the solution. Customarily, castings are immersed in the hot supersaturated solution and heated in some cases to a temperature approaching that at which the oil is maintained, and then they are removed and cleaned. Best results have been obtained by cleaning the treated castings before they have had an opportunity to cool, for the subsequent cooling after cleaning has been found to expel much of the oil solution from the flaws and to cause rapid recrystallization of the fluorescent "concentrates," which then piles or accumulates about the surface apertures of the flaws to produce an unmistakable fluorescent indicator that continuously increases in the intensity of its fluorescence as more "concentrate" is carried from the flaw opening. "Fluorol V Powder" dissolved in kerosene, paraffin oil, commercial ink oil and the like, has been used successfully in the above-described procedure; other "concentrates" which exhibit brilliant fluorescence in crystalline form and may be applied in common oil-like solvents are 2-aceto-1-naphthol, dibenzanthracene, methyl cholanthrene, anthrahydroquinone diacetate, fluorenone, anthracene, phenanthrene, etc.

Example 4.—It may be found advantageous in some instances to employ solvents other than oils in the formulation of solutions which are fluorescent in the fluid state. A combination of glycerine and alcohol fluoresces a vivid red upon addition of a small amount of tetra-ethyl-diamino-o-carboxyphenyl-xanthenyl chloride. Similarly, tetra-methyl-diamino-diphenyl-ketonimine hydrochloride causes green fluorescence in mixtures consisting of a few parts of white shellac in many parts of an alcohol; diamino-stilbene-di-sulphonic acid in aqueous solutions of dextrine and glycerine fluoresces a brilliant whitish-blue; fluorescein diacetate exhibits intense yellow fluorescence in alcoholic potash; 1-naphthol-4-sulfonic acid fluoresces a vivid blue in basic solutions; 1-naphthylamine-6 and 7-sulfonic acids fluoresce blue-white to blue-green in alcoholic potash; beta-naphthoquinaldine exhibits whitish-yellow fluorescence in dilute acetic acid; resorcinol succinein fluoresces yellow to yellow green in alcohols, dilute acids, dilute bases, etc., and sodium-beta-naphthaquinoline-sulfonate fluoresces blue in dilute acid and leaves a yellow-green fluorescing compound when applied in alcoholic potash.

Example 5.—An important embodiment of this invention comprises the treatment of metallic bodies with a plurality of agents which form, in the proximity of flaws, a reaction product that fluoresces distinctively upon exposure of the treated body to filtered fluorescigenous radiant energy. For example, castings may be treated primarily with a solution of tetra-methyl-diamino-diphenyl ketonimine hydrochloride in a high boiling point alcohol, then cleaned, and subsequently treated with a fluorescence "developer," such as a coating material consisting of lithopone ground into an alcoholic solution of white shellac. In this case, neither the primary nor secondary treating solutions are fluorescent, but a fluorescent reaction product is formed where the secondary agent absorbs and is dyed by the primary agent remaining in and about the flaw openings after cleaning. Thus, the locations of flaws are readily revealed during exposure to filtered ultra-violet light by vividly fluorescent lines and smears.

Example 6.—A modified flaw detection procedure likewise requiring the use of ultra-violet light during final inspection entails, firstly, the immersion of metallic bodies in a common solvent such as water or alcohol, secondly, the thorough drying of the external body surfaces, and thirdly, the tumbling of the bodies in a container partially filled with a fine, dry powder which forms a fluorescent product upon its absorption of any of the primary treating solvent remaining in and about the surface openings of flaws. A fine, dry dust composed of powdered tetra-ethyl-diamino-o-carboxyphenyl-xanthenyl chloride ground in white flour or powdered sugar will not fluoresce in dry form, but will absorb moisture readily to produce a sticky compound which fluoresces a brilliant red. Tumbling of the metallic bodies in such a dust usually results in the formation of a fluorescent indicator on their surfaces in the proximity of flaw openings, and subsequent examination in filtered ultra-violet light readily reveals the locations of flaws by fluorescent lines and smears.

I claim:

1. The method of detecting flaws in a metallic body, comprising treatment of the body with a primary agent capable of penetrating the flaws, removal of the agent from the external body surfaces, and treatment of the body with a second agent reactive with the primary agent to form a product in the proximity of flaw surface outlets differing from the body surfaces in response to ultra-violet radiations.

2. The method of locating flaws in metallic bodies, comprising treating the bodies with a substance capable of penetrating the flaws, cleaning the substance from the external body surfaces, treating the bodies with another substance which, in combination with the first substance retained in the flaws and about flaw surface openings, becomes distinctive from adjacent body surfaces in response to fluorescigenous radiant energy, and subsequently exposing the bodies to the action of fluorescigenous radiant energy.

3. The method of detecting flaws in metallic bodies, comprising treatment of the body with a compound under super-atmospheric pressure and heated to super-atmospheric temperatures, whereby a portion of the compound is forced into existing flaws, removal of the compound from external body surfaces, and treatment of the body with a secondary compound which reacts with the primary compound retained in and about the flaws to form a fluorescent reaction product.

4. In a process of locating flaws in metallic bodies, the step which comprises producing a reaction between an agent retained internally of the flaws and an agent applied to the external body surfaces, whereby a fluorescent product is formed in the loci of flaw openings.

5. The method of detecting sub-surface flaws in a substantially solid body comprising the steps of applying to the outer surfaces of the body a luminescent substance which will penetrate into the surface openings of the sub-surface flaws and which is distinguishable from the surface of the body, removing the portion of the substance remaining on the outer surfaces of the body and then inspecting the surface of the body for the portion of the luminescent substance which had penetrated into the surface openings of the sub-surface flaws and which reappears on the surface of the body.

6. The method of detecting sub-surface flaws in a substantially solid body comprising the steps of applying to the outer surfaces of the body a fluorescent substance which will penetrate into the surface openings of the sub-surface flaws, removing the portion of the substance remaining on the outer surfaces of the body, and then subjecting the body to fluorescigenous radiations, whereby the fluorescence of the substance which had penetrated the sub-surface flaws will reveal the location of the sub-surface flaws in the body.

7. The method of detecting sub-surface flaws in a substantially solid body comprising the steps of applying to the outer surfaces of the body a fluorescent liquid which will penetrate into the surface openings of the sub-surface flaws, cleaning the body by removing a portion of the outer surface of the body and the fluorescent liquid applied thereto, allowing the body to stand until some of the fluorescent liquid which had penetrated the surface flaws is exuded from the flaws, and then examining the cleaned surface under fluorescigenous radiations whereby the fluorescence of the liquid exuded upon the cleaned surface will reveal the presence of sub-surface flaws.

8. The method of detecting flaws as defined in claim 6 including the step of heating the fluorescent substance.

9. The method of detecting flaws as defined in claim 6 including the step of subjecting the fluorescent substance to pressure.

10. The method of detecting flaws as defined in claim 6 including the steps of subjecting the fluorescent substance to heat and pressure to force the fluorescent substance into the surface openings of the sub-surface flaws.

11. The method of detecting flaws in a substantially solid body comprising the steps of applying to a surface of the body a fluorescent oil which will penetrate into the surface openings of the flaws, cleaning the surface of the body to remove the fluorescent oil thereon, subjecting the cleaned body to heat, and then subjecting the body to fluorescigenous radiations, whereby the presence of flaws will be indicated by the fluorescent oil exuded from the surface openings of the subsurface flaws.

12. The method of detecting flaws in a body comprising the steps of applying to the body a liquid which will penetrate the surface openings of sub-surface flaws, which liquid carries a fluorescent substance, removing the liquid from the surface of the body, and subsequently subjecting the surface of the body to fluorescigenous radiations, whereby the presence of the flaws in the body will be revealed by the fluorescent substance carried into the flaws by the penetrating liquid and which reappears on the surface of the body after the liquid has been removed from the surface.

13. The method of detecting flaws in a body comprising the steps of applying to the body a luminescent substance in a liquid state which will permit the substance to penetrate the surface openings of sub-surface flaws in the body, removing the substance from a surface of the body, and then subjecting the surface to exciting radiations, whereby flaws will be revealed by the presence of the luminescent substance at the surface openings of the sub-surface flaws on the surface of the body.

ROBERT C. SWITZER.